United States Patent Office 3,520,853
Patented July 21, 1970

3,520,853
PRODUCTION OF LINEAR POLYESTERS
Hideaki Munakata, Hiroyoshi Kamatani, Akira Uejima, Tetsuo Ukai, and Toshiyuki Mizumoto, Ootsu, Japan, assignors to Toyo Boseki Kabushiki Kaisha, Osaka, Japan
No Drawing. Filed Apr. 30, 1969, Ser. No. 820,614
Claims priority, application Japan, Apr. 30, 1968, 43/29,254
Int. Cl. C08g 17/04, 35/00
U.S. Cl. 260—78.4                    8 Claims

ABSTRACT OF THE DISCLOSURE

The present invention provides a method for the production of polyesters by esterifying benzene dicarboxylic acid with ethylene oxide in a solvent and then subjecting the esterification reaction product to polycondensation without the isolation and purification of the ester, characterized by the fact that the esterification is conducted in the presence of a catalyst selected from the group consisting of primary amines, secondary amines, tertiary amines, their carboxylic acid salts, and quaternary ammonium salts of carboxylic acid salts, and that, prior to the polycondensation, the solvent and unreacted ethylene oxide in the esterification reaction product are thoroughly removed at a temperature not higher than 180° C. until the ethylene oxide content is reduced to an amount represented by the following formula:

$$EO \leq \frac{2.3}{ES - 15} \qquad (1)$$

wherein EO is mol number of remaining ethylene oxide per mol of the ester and ES (percent) is a degree of esterification of all the carboxylic group.

---

This invention relates to improvements in the production of high polymeric linear polyesters from benzene dicarboxylic acid and ethylene oxide. More particularly the present invention relates to a process for producing polyethylene terephthalate or copolyester consisting mainly of ethylene terephthalate unit by esterifying terephthalic acid or a mixture of terephthalic acid and other dicarboxylic acid(s) with ethylene oxide and then polycondensing the resulting product without isolation nor purification.

It is known to produce a polyester, particularly polyethylene terephthalate by reacting terephthalic acid and ethylene oxide to prepare bis(2-hydroxyethyl)terephthalate (hereinafter referred to as BHET) which is then polycondensed. Thus, typically, terephthalic acid and ethylene oxide are reacted in water or an inert organic medium in the presence of an esterifying catalyst to prepare BHET, which is isolated and purified, and then subjected to polycondensation. In these conventional methods, the purification of BHET has been indispensable or essential. If no such purification is conducted ether bond-containing by-products formed during the esterification reaction and the esterifying catalyst will be introduced into the resulting polyester and will cause remarkable quality deteriorations of the polymer such as reduction of melting point, decrease in thermostability and increase in discoloration. Therefore, the entire process is compelled to be divided into the three separate steps, i.e. esterifying, purification and polycondensation, with a result that the process is complicated and expensive.

It is also known in French Pat. No. 1,428,204 to produce polyesters by reacting benzene dicarboxylic acid with alkylene oxide under a superatmospheric pressure without using a solvent and then heating the reaction product at a temperature above 200° C. under a reduced pressure. In this process, both the purification of BHET and recovery of the solvent is unnecessary and, therefore, the process itself would be very simple. However, since the ether bond-containing by-products formed in the esterification reaction are not removed they are introduced into the resulting polyester, which therefore has a high ether-bond content and is low in melting point and is inferior in the quality.

Therefore, it is an object of this invention to provide an improved method of producing polyesters having high melting point and no discoloration from benzene dicarboxylic acid and ethylene oxide wherein the benzene carboxylic acid and ethylene oxide are reacted together in a solvent in the presence of a certain esterifying catalyst to prepare the corresponding bis-glycol ester product, which after a special treatment but without isolation or purification is subjected to polycondensation.

Another object of this invention is to provide an improved method of recovery of the solvent and unreacted ethylene oxide used in the above mentioned esterification reaction.

Other objects, features and advantages of the invention will be apparent from the following description.

It is a usually adopted procedure that the pressure of the reaction system is reduced to the atmospheric pressure after the esterifying reaction and the greater part of volatile matters such as the unreacted ethylene oxide and the solvent is distilled off. However, it has been found that it is very difficult to remove ethylene oxide occluded in the reaction (esterification) product, and unless a special positive measure is taken at least about 0.06 mol of ethylene oxide per mol of the ester remain in the product in equilibrium state at a temperature between 100 and 130° C. (usual esterification temperature). If the esterification reaction product is purified, for example, by recrystallization, the residual ethylene oxide will be easily removed so that no such trouble mentioned before would occur in the subsequent polycondensation. However, such isolation and purification are troublesome and time-consuming.

It has hitherto been considered that such a small amount of the residual ethylene oxide will be completely distilled off in the initial stage of the polycondensing reaction conducted at a high temperature under reduced pressure. Therefore no attention has been particularly paid to remove ethylene oxide remaining in the esterification product. In contrast, we have found that even at such high temperature (polycondensation temperature) such residual ethylene oxide will be not easily distilled off but rather cause an addition reaction to the hydroxyl group of the bis-glycol ester to form undesirable ether-bonds in the polycondensation product. It has further been found that such addition reaction occurs particularly above 180° C. On the basis of these findings, it has been found that if the remaining ethylene oxide is substantially completely removed at a temperature not higher than 180° C. the esterification product, even without isolation and purification of the ester, may be subjected to the polycondensation to obtain an excellent linear polyester low in the ether-bond content and high in the melting point.

It has hitherto been thought by those in the art that if the esterification reaction product, without isolation and purification of the ester, is subjected to polycondensation the ether bond formed in the stage of the esterification is introduced into the resulting polymer chain so that polymer of a high melting point can not be obtained. It is therefore surprising that the slight amount of residual ethylene oxide lowers, though not totally, the melting point of the polymer.

The influence of the remaining ethylene oxide in the esterification reaction product on the melting point of the resulting polymer or polyester would be illustrated later in Example 1. In any event, the smaller the amount of the residual ethylene oxide, the better the result. For example, when the esterification degree is 70% the allowable upper limit of the amount of ethylene oxide in the esterification product according to this invention would be 0.04 mol as calculated from the Formula 1 hereinbefore given, but it is preferable that the amount is controlled to be less than 0.03 mol.

The other reason for conducting the removal of unreacted ethylene oxide from the esterification product at a temperature not higher than 180° C. in this invention is in that, only at a temperature not higher than 180° C., the vapor recovered would consist substantially of the solvent and unreacted ethylene oxide, without any noticeable contamination of the catalyst or its decomposition products. This is very important in carrying out the process in an industrial scale.

In this connection, we have found an interesting behavior of the amine catalyst. Thus, when a primary amine, secondary amine, tertiary amine or carboxylic acid salt thereof is added to a reaction system comprising terephthalic acid, ethylene oxide and an organic solvent, and the esterifying reaction is conducted at a temperature not higher than 180° C., the catalyst would be present, in the resulting product, always in the form of the corresponding quaternary ammonium carboxylic acid salt (or quaternary ammonium terephthalate when a free amine is initially added). The carboxylic acid salt is stable at a temperature not higher than 180° C. while it decomposes forming volatile matter at a temperature higher than 180° C. Therefore, if the esterification reaction product is heated at a temperature not higher than 180° C. in the recovery of the solvent and ethylene oxide, the amine catalyst (even if the catalyst as initially added has a boiling point lower than 180° C.) would remain in the liquid phase and would not vaporize together with the solvent and unreacted ethylene oxide. As a result, the vapor would not contain such catalyst but consist substantially only of the solvent and ethylene oxide. This is industrially significant because if the catalyst or its decomposition products is mixed into the vapor there would be caused troubles and difficulties in the recovery and reuse of the solvent and ethylene oxide, for example, as follows:

(1) When the recovered liquid is reused as such, the reaction rate would vary and/or undesirable side-reaction would occur due to the presence of the catalyst or its decomposition products as contained in said liquid.

(2) It is technically very difficult or expensive to purify the recovered liquid to remove such small amount of the catalyst or its decomposition products.

(3) From the safety point of view, it is not desirable that a substance having catalytic activity is mixed in a vapor containing ethylene oxide which is very high in reactivity.

(4) When the recovered liquid is stored for a long period of time, there would occur undesirable reaction between ethylene oxide and catalyst or its decomposition products.

Therefore, according to this invention, it is essential that, in recovery of the solvent and unreacted ethylene oxide, the esterification product be maintained at a temperature not higher than 180° C. Since the vapor generated under such temperature condition would consist only of the solvent and ethylene oxide without undesirable contamination, the recovered liquid may be reused as such without further purification.

However, if the temperature is lower than 120° C. the flowability of the unvolatile slurry consisting of BHET, unreacted acid, etc. is unduly lowered. Under such condition, there tends to occur clogging in the pipe, pump or the like to convey the product from the evaporator to the next stage. Further, the product would tend to deposit or adhere onto those portions (e.g. agitating shaft) in the evaporator where the temperature is locally lower and to stay longer there causing undesirable reaction. These are caused by the fact that the melting temperature of BHET is 110° C. Therefore, even above 110° C., it is preferable to avoid to operate at a temperature close to 110° C. It has been found to be preferable that the liquid phase temperature is maintained above 120° C. by positively heating the product to supplement the large amount of latent heat of evaporation to be lost from the liquid.

In carrying out the method of this invention, any suitable method may be employed for reducing the amount of remaining ethylene oxide in the esterification reaction product to the value represented by the Formula 1 at a temperature not higher than 180° C. Thus, for example, an inert gas such as nitrogen is blown into the reaction vessel or preferably into the reaction product, or the pressure in the reaction vessel is reduced so that the partial pressure of the ethylene oxide in the reaction vessel is lowered. It is also possible to spread the reaction product in a thin layer or fine particles in order to promote the diffusion and evaporation of ethylene oxide occluded in the product. If desired, the reaction product under pressure may be flushed into an evaporator (atmospheric or reduced pressure).

It will be noted that the above mentioned removal of ethylene oxide is the matter to be taken after the esterification and has nothing to do with the esterification itself. Thus, the esterification per se may be conducted in any conventional manner except that a certain amine catalyst should be employed as explained before. However, the esterification in aqueous system which results in the formation of many etherbonds is not suitable in this invention. Therefore, it is preferable to conduct the esterification in the absence of a solvent or in the presence of an inert organic liquid as a solvent or dispersing medium.

The effect of removing the residual ethylene oxide as mentioned above would be recognized in any case regardless of the particular conditions of the esterifying reaction. However, in order to obtain a polyester of a particularly high melting point and high whiteness, it is desirable to carry out the esterifying reaction under controlled conditions. Thus, for example, it is preferable to conduct the esterification under the following conditions. The reaction of benzene dicarboxylic acid with ethylene oxide is conducted in an inert organic liquid in the presence of a catalyst selected from the group consisting of primary amines, secondary amines, tertiary amines, their carboxylic acid salts and quaternary ammonium salts (the amount of the organic liquid being 20 to 200% by weight based on the benzene dicarboxylic acid) until 55 to 90% of all the carboxyl group of the benzene dicarboxylic acid has been esterified. When the esterification is conducted in the absence of inert organic liquid there will be formed many ether bonds or linkages in the resulting product so that the melting point of the polymer produced therefrom will be low. Therefore, it is desirable to conduct the esterifying reaction in the presence of a proper amount of an inert organic liquid.

The inert organic liquids suitable for the medium of this reaction are those having a boiling point lower than that of ethylene glycol. Examples thereof are diethyl ether, dipropyl ether, methyl-n-butyl ether, tetrahydrofuran, dioxane, anisol, acetone, methyl ethyl ketone, di-n-propyl ketone, cyclohexanone, cyclohexane, decaline, n-hexane, heptane, benzene, toluene, xylene and chlorobenzene.

The following relationship has been found between the amount of the organic medium and the amount of the by-produced ether bond. When tetrahydrofuran, for example, is used as the organic liquid, the amount of the ether bond to be by-produced shows a tendency to decrease with the increase of the amount of tetrahydrofuran. This tendency is very remarkable when the amount of tetrahydrofuran is less than that of the benzene dicarboxylic acid, but becomes less as the amount of tetrahydrofuran increases to twice the weight of the benzene dicarboxylic acid. Even if the amount of tetrahydrofuran is increased to be more than twice the amount of the carboxylic acid the formation of the ether linkage will no longer decrease. Therefore, the use of tetrahydrofuran in an amount more than 200% on the weight of benzene dicarboxylic acid no more contributes to the further prevention of the formation of ether bonds, but decreases the activity of the esterifying catalyst, with a result that an increase in the amount of catalyst is required, which increases the discoloration of the resulting polymer. The same tendency is observed with other inert organic liquids.

Examples of amine catalysts to be used in this invention are primary amines such as ethyl amine, butyl amine, etc., secondary amines such as diethyl amine, dibutyl amine, diisoamyl amine, etc., tertiary amines such as trimethylamine, triethylamine, tripropylamine, tri-n-butylamine, tri-n-amylamine, diethyl ethanolamine, dimethyl ethylamine, di-n-butyl isoamylamine, diisobutyl ethanolamine, N,N,N',N'-tetraethyl ethylenediamine, etc., their carboxylic acid (particularly terephthalic acid) salts; and quaternary ammonium carboxylic acid salts such as bis(tetraethylammonium)terephthalate, tetraethylammonium benzoate, bis(2-hydroxyethyl triethylammonium)terephthalate, bis(2-hydroxyethyltripropyl ammonium) terephthalate, mono(2 - hydroxypropyltriethyl ammonium)terephthalate. Among them, aliphatic tertiary amines are most preferable.

The amount of such amine catalyst may be 0.0001–0.05 mol per mol of the carboxylic acid used in the esterifying reaction. The use of a higher amount of the amine catalyst should be avoided because it would cause discoloration of the polymer to be produced.

Even when the esterification is conducted in the presence of the tertiary amine catalyst and using a suitable amount of the organic liquid as explained before, the formation of ether-linkage would be remarkable, if the reaction is continued until all the carboxyl group of the dicarboxylic acid is substantially completely esterified. It has been found that in order to produce a polyester having a high melting point without the purification of the intermediate product (esterification product), the esterification reaction should be stopped when at most 90% of all the carboxyl group has been esterified. As regards the lower limit of the esterification degree (conversion), theoretically 50% esterification would be necessary and sufficient to effect the subsequent polycondensation reaction. However, in actual operation, under such 50% esterification, the polycondensation does not proceed smoothly so that it is difficult to obtain a polymer with a satisfactory high polymerization degree. In this connection, it has been found that at least 55% of all the carboxyl group must be esterified. The most desirable esterification degree is 60 to 80%.

In order to cease the esterification rate at a desired stage, it is preferable that, when the desired conversion (esterification degree) has attained, the reaction system is opened to atmospheric pressure or flushed into an evaporator and the excess ethylene oxide and organic solvent are distilled off.

If the esterification reaction is conducted under the above mentioned controlled conditions and then the content of residual ethylene oxide in the resulting product is reduced to a value satisfying the Formula 1 at a temperature not higher than 180° C., the esterification reaction product may be, without isolation and purification, subjected to polycondensation to obtain a polymer of a high melting point and desirable whiteness comparable to those obtained by the polycondensation of purified ester.

Except the above mentioned points the esterification may be conducted in a conventional manner. Thus, for example, the esterifying reaction may be conducted at a temperature of 80 to 130° C. for 0.2 to 4 hours.

Among the benzene dicarboxylic acids, terephthalic acid is most preferable. It may be used as a mixture with less than about 20 mol percent of other dicarboxylic acid(s), as comonomer component, such as isophthalic acid, phthalic acid, adipic acid, naphthalene-1,5-dicarboxylic acid, bis(4-carboxyphenyl)ether or 5-chloroisophthalic acid. If desired the comonomer component may be added to the ester material prior to the polycondensation.

The amount of ethylene oxide is usually in the range of 1.1 to 2.5 mols per mol of the dicarboxylic acid. A larger amount may be used if desired.

The esterification reaction product from which unreacted ethylene oxide has thoroughly been removed in accordance with this invention and which is to be subjected to polycondensation contains free carboxylic groups corresponding to 10–45% of all the carboxyl group of the initial carboxylic acid. Thus it is a mixture of the benzene dicarboxylic acid and its ethylene glycol ester. When it is heated to a temperature above 200° C., the free carboxyl group will react with the hydroxyl group of the ethylene glycol ester to be esterified within a comparatively short time to form a polyester or copolyester. This is the well known polycondensation reaction.

In the course of this polycondensation conducted at a temperature higher than 180° C., the quaternary ammonium salt resulted from the amine catalyst and present in the esterification reaction product will be gradually decomposed into volatile substances, which are distilled out of the polycondensation system together with water and ethylene glycol formed during the polycondensation. Fortunately, this behavior of the quaternary ammonium salt does not adversely affect the polycondensation reaction but is rather effective in preventing undesirable side-reaction such as the formation of ether-linkage.

The polycondensation may be conducted in a conventional or well known manner by the use of a polycondensation catalyst known in the art of the production of polyesters. Thus, for example, the polycondensation reaction may be conducted at a temperature of about 200–300° C. under a reduced pressure of 0.2 mm. Hg or lower in the presence of a polycondensation catalyst. Usually the reaction is conducted for 0.5–5 hours.

It is of course possible to add modifiers, stabilizers, colorants, titanium oxide, pigments, etc. which are known per se as additives for polyesters.

The polyesters or copolyesters to be obtained by this invention are useful for forming fibers, films and other shaped articles.

The invention will be further explained by way of the following examples wherein all parts are by weight and the intrinsic viscosity was determined in phenol-tetrachloroethane (6:4) at 30° C.

EXAMPLE 1

In this example, the relationship between the amount of the ethylene oxide remaining in a terephthalic acid-ethylene oxide reaction product with various esterification degrees and the melting point of the polyethylene terephthalate produced therefrom was investigated.

A mixture of 100 parts of terephthalic acid, 54 parts of ethylene oxide, 140 parts of toluene and 0.8 part of triethylamine was charged into an autoclave and heated at 120° C. to conduct esterification. At the end of the esterifying reaction, the exhaust valve was opened to distil off volatile matters and then nitrogen gas was blown into the reaction mixture at 120° C. to expel the residual ethylene oxide. Then the valve was closed and the temperature was elevated from 255° C. to 265° C. within 40 minutes while intermittently discharging water formed during the reaction. After 0.03 part of antimony trioxide was added, ethylene glycol was distilled off under a reduced pressure of about 350 mm. Hg for 20 minutes and polycondensation was conducted at 275° C. under 0.03 mm. Hg. The influences on the melting point of the resulting polymers produced from the esterification products of which unreacted ethylene oxide was distilled off to different extents are shown in Table 1.

TABLE 1

| Esterification degree, percent: | Ethylene oxide reduce to mol/BHET mol | Melting point of polymer, °C. | EO value, Formula 1 |
|---|---|---|---|
| 55 | 0.00 | 268 | 0.06 |
| 59 | 0.05 | 260 | 0.05 |
| 57 | 0.08 | 256 | 0.05 |
| 74 | 0.00 | 267 | 0.04 |
| 72 | 0.02 | 265 | 0.04 |
| 76 | 0.03 | 264 | 0.04 |
| 71 | 0.04 | 260 | 0.04 |
| 70 | 0.07 | 256 | 0.04 |
| 71 | 0.10 | 253 | 0.04 |
| 88 | 0.00 | 264 | 0.03 |
| 88 | 0.03 | 260 | 0.03 |
| 90 | 0.07 | 254 | 0.03 |
| 99 | 0.00 | 255 | 0.03 |

As apparent from the above table, the relationship between the amount of residual ethylene oxide and melting point of resulting polymer somewhat varies depending upon the esterification degree. Generally, in order to obtain a polymer of a predetermined melting point, the allowable amount of ethylene oxide decreases as the esterification degree increases. It has been determined from experiments that in order to obtain a polymer having a melting point of about 260° C. or higher, the amount of residual ethylene oxide in the esterification product to be subjected to polycondensation should satisfy the Formula 1 indicated hereinbefore. It will also be apparent from Table 1 that, when the esterification degree is 90% or higher, it would be difficult to obtain a polymer having a melting point of 260° C. or higher even if ethylene oxide is completely removed.

EXAMPLE 2

A mixture of 400 parts of terephthalic acid, 220 parts of ethylene oxide, 2.5 parts of tri-n-butylamine and 400 parts of tetrahydrofuran was charged into an autoclave and heated at 110° C. for 2 hours to conduct esterification. An analysis of a part of the product showed that 71% of all the carboxyl groups had been esterified. Then a valve was opened to distill off volatile matters. About 6 parts (0.08 mol per mol of BHET) of ethylene oxide was found to still remain in the product. Then, the autoclave was connected to a vacuum line and the distillation of volatile matters was continued under a reduced pressure. After ethylene oxide became no longer detected in the reaction mixture, the valve was closed. The temperature was elevated up to 255° C., and then ethylene glycol was refluxed while water was allowed to distill and the temperature was gradually elevated to 265° C. in 40 minutes. At the end of this time, 0.13 part of antimony trioxide was added and then ethylene glycol was distilled off under a reduced pressure of 200 mm. Hg for 20 minutes. The temperature was further elevated to 275° C., which was maintained for 90 minutes under 0.01 mm. Hg to obtain a polymer having an intrinsic viscosity of 0.67 and a melting point of 267° C. and favorable color or shade.

The same esterification and subsequent polycondensation were repeated except that the temperature was elevated after the esterification and without the complete removal of ethylene oxide, that is, while ethylene oxide of about 0.08 mol per mol of BHET remained. There was obtained a polymer having an intrinsic viscosity of 0.63 and a melting point of 257° C.

EXAMPLE 3

A mixture of 400 parts of terephthalic acid, 230 parts of ethylene oxide, 1.1 parts of triethylamine and 200 parts of xylene was introduced into an autoclave and was allowed to react at 120° C. for 100 minutes until 64% of the carboxyl group was esterified. Then the reaction mixture was flushed into an atmospheric pressure vessel having a capacity 4 times the autoclave and provided with a distilling pipe. The ethylene oxide remaining in the resulting solid product was 0.03 mol per mol of BHET. When the product was returned to the autoclave and was polycondensed under the same conditions as in Example 2, there was obtained a polymer having an intrinsic viscosity of 0.70 and a melting point of 264° C.

EXAMPLE 4

A mixture of 90 parts of terephthalic acid, 10 parts of isophthalic acid, 100 parts of ethylene oxide, 150 parts of n-heptane and 1 part of diethyl ethanolamine was charged into an autoclave and was allowed to react at 130° C. for 40 minutes. The conversion (esterification degree) was 84%. The valve of the autoclave was opened and nitrogen gas was blown in until the amount of remaining ethylene oxide was reduced to 0.03 mol per mol of the ester. Then 0.03 part of antimony trioxide was added, the temperature was elevated while distilling off the volatile matters and heating was continued at 260° C. for 30 minutes under atmospheric pressure and for 60 minutes under a reduced pressure of less than 0.1 mm. Hg. There was obtained a polymer having an intrinsic viscosity of 0.70 and a melting point of 241° C.

EXAMPLE 5

In this example, the influence of the amount of the solvent used in the esterifying reaction on the quality of the resulting polymer was studied. Thus, a mixture of 100 parts of terephthalic acid, 54 of ethylene oxide and varying amount of solvent (xylene) and catalyst (triethylamine) as shown in Table 2 was allowed to react at 120° C. for 100 minutes (for 80 minutes where no solvent was employed). Then, under the atmospheric pressure, nitrogen gas was blown into the reaction mixture until ethylene oxide became no longer detected. Then the polycondensation reaction was conducted in the same manner as in Example 1. It was found from the results shown in Table 2 that, when the solvent was not used, the esterification reaction proceeded well and the color of the polymer was favorable but the melting point of the polymer was low. On the other hand, when the amount of solvent was too large, the catalyst concentration reduced and the esterification speed was lowered. When the amount of the catalyst was increased to accelerate the esterification, the discoloration of the polymer increased.

TABLE 2

| Amount of solvent [1]: | Amount of catalyst [2] | Esterification degree | Melting point of polymer | Color of polymer |
|---|---|---|---|---|
| 0 | 0.008 | 81 | 250 | Colorless. |
| 0.5 | 0.008 | 84 | 261 | Do. |
| 1.0 | 0.008 | 67 | 265 | Do. |
| 1.4 | 0.008 | 55 | 268 | Do. |
| 5.0 | 0.008 | 17 | ([3]) | |
| 5.0 | 0.030 | 59 | 267 | Brown. |

[1] Weight ratio of solvent xylene to terephthalic acid.
[2] Mol ratio of triethylamine to terephthalic acid.
[3] No polymer was produced.

EXAMPLE 6

Terephthalic acid was continuously charged through a hopper into a mixer at a rate of 250 parts/hr. To this mixer were also continuously fed benzene at a rate of 200 parts/hr., ethylene oxide at a rate of 60 parts/hr. and triethylamine at a rate of 1.05 parts/hr. The mixture in the form of slurry was continuously fed through a pump to a pressurized rection vessel, to which was also continuously fed through another pump ethylene oxide at a rate of 80 parts/hr. In the reaction vessel terephthalic acid and ethylene oxide were reacted with each other at 115° C. under a pressure of 15 kg./cm.$^2$ G. At the bottom of the reaction vessel, the esterification reaction product (esterification degree of terephthalic acid: 60%) was continuously discharged into a flash evaporator. In the evaporator the pressure was maintained atmospheric while the liquid phase was heated at 140° C. The analysis of the vapor coming out of the evaporator and condensed indicated that it consists only of ethylene oxide and benzene free from any other substance. The condensed liquid was recovered and returned to the mixer. The product after stripping at the evaporator and consisting of BHET and terephthalic acid (with residual ethylene oxide in an amount of 0.01 mol per mol of BHET) was conveyed into an atmospheric pressure reaction vessel heated at 250° C. to form lower molecular weight polyester, which was then transferred to a polymerization vessel wherein polycondensation was conducted at 275° C. in the presence of antimony trioxide (0.03 mol percent). The resulting polyester had an intrinsic viscosity of 0.61, a melting point of 267° C. and favorable color shade.

For comparision, the same procedure was repeated except that the liquid phase in the evaporator was heated at 200° C. The recovered liquid, upon analysis, contained substances obviously derived from the esterification catalyst. The recovered liquid was returned to the mixer to further continue the reaction. The esterification product was gradually discolored to light yellow, and the resulting polyester had an intrinsic viscosity of 0.62 and a melting point of 262° C. and had light yellowish color.

EXAMPLE 7

To a reaction vessel were continuously fed terephthalic acid at a rate of 250 parts/hr. benzene at a rate of 200 parts/hr., ethylene oxide at a rate of 140 parts/hr. and bis(tetraethyl ammonium)terephthalate at a rate of 1.9 parts/hr. The esterification was conducted at 120° C. The esterification reaction product continuously discharged from the reaction vessel was 67% in the esterification degree (i.e. 67% of terephthalic acid was esterified). The product was passed through a flash evaporator wherein volatile matter was distilled off at a liquid phase temperature of 150° C. and under atmospheric pressure. The vapor was consisted only of ethylene oxide and benzene free from any other substance. The product after stripping at the evaporator and consisting of BHET and terephthalic acid (with residual ethylene oxide in an amount of 0.01 mol per mol of BHET) was conveyed into an atmospheric pressure reaction vessel heated at 245° C. to form lower molecular weight polyester, which was then transferred to a polymerization vessel wherein polycondensation was conducted at 275° C. in the presence of antimony oxide (0.03 mol percent). The resulting polyester had an intrinsic viscosity of 0.59 and a melting point of 267° C.

EXAMPLE 8

To a reaction vessel were continuously fed terephthalic acid at a rate of 180 parts/hr., isophthalic acid at a rate of 20 parts/hr., xylene at a rate of 200 parts/hr., ethylene oxide at a rate of 120 parts/hr. and di-n-propyl amine at a rate of 1.1 part/hr. The esterification reaction was conducted at 105° C. The esterification product continnoisly discharged from the reaction vessel was 75% in the esterification degree. The product was passed through an evaporator wherein volatile matter was distilled off at a liquid phase temperature of 140° C. and under a pressure of 200 mm. Hg. The vapor was consisted only of ethylene oxide and xylene free from any other substance. The product after stripping at the evaporator and consisting of BHET, bis(2-hydroxyethyl)isophthalate (referred to as BHEI), terephthalic acid and isophthalic acid (with residual ethylene oxide in an amount of 0.015 mol per mol of BHET plus BHEI) was conveyed into an atmospheric pressure reaction vessel heated at 245° C. to form low molecular weight copolyester, which was then transferred to a polymerization vessel wherein polycondensation was conducted at 255° C. in the presence of antimony trioxide (0.03 mol percent). The resulting copolyester had an intrinsic viscosity of 0.63 and a melting point of 239° C.

What we claim is:

1. A method of producing a high polymeric linear polyester by esterifying benzene dicarboxylic acid with ethylene oxide in a solvent and then subjecting the esterification reaction product to polycondensation without the isolation and purification of the ester in said reaction product, characterized in that the esterification reaction is conducted in the presence of a catalyst selected from the group consisting of primary amines, secondary amines, tertiary amines, their carboxylic acid salts and quaternary ammonium salts of carboxylic acids, and that, prior to the polycondensation, the solvent and unreacted ethylene oxide in the esterification reaction product are thoroughly removed by distillation at a temperature not higher than 180° C. until the remaining ethylene oxide content is reduced to an amount represented by the following formula:

$$EO \leq \frac{2.3}{ES-15}$$

wherein EO is mol number of remaining ethylene oxide per mol of the ester and ES (percent) is the degree of esterification of all the carboxylic group.

2. A method as claimed in claim 1 wherein the esterification reaction is conducted in the presence of an inert organic solvent in an amount of 20–200% by weight based on the benzene dicarboxylic acid employed.

3. A method as claimed in claim 1 wherein the esterification reaction is conducted until 55–90% of all the carboxylic group has been esterified.

4. A method as claimed in claim 1 wherein the solvent and unreacted ethylene oxide distilled off from the esterification reaction product and substantially free from any other substance are recovered for reuse.

5. A method as claimed in claim 1 wherein the distillation is conducted at a temperature higher than 120° C.

6. A method as claimed in claim 1 wherein the catalyst is an aliphatic tertiary amine.

7. A method as claimed in claim 1 wherein the amount of the catalyst is 0.0001 to 0.05 mol per mol of the carboxylic acid.

8. A method as claimed in claim 1 wherein the dicarboxylic acid is a mixture of 80 mol percent or more of terephthalic acid and 20 mol percent or less of other dicarboxylic acid(s).

References Cited

UNITED STATES PATENTS 2,966,479  12/1960  Fischer _____ 260—78.4
3,254,060   5/1966  Connolly et al. _____ 260—78.4

JOSEPH L. SCHOFER, Primary Examiner

J. KIGHT, III, Assistant Examiner